US011289928B1

(12) United States Patent
Brady

(10) Patent No.: US 11,289,928 B1
(45) Date of Patent: Mar. 29, 2022

(54) MAGNETICALLY-RETAINED RECHARGE CARTRIDGE

(71) Applicant: Amazon Technologies, Inc., Seattle, WA (US)

(72) Inventor: Matthew Anthony Brady, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 16/601,273

(22) Filed: Oct. 14, 2019

(51) Int. Cl.
*H02J 7/00* (2006.01)
*H01R 13/62* (2006.01)
*H01M 10/46* (2006.01)

(52) U.S. Cl.
CPC ........... *H02J 7/0045* (2013.01); *H01M 10/46* (2013.01); *H01R 13/6205* (2013.01)

(58) Field of Classification Search
None
See application file for complete search history.

(56) References Cited

U.S. PATENT DOCUMENTS

| 2011/0246014 | A1* | 10/2011 | Sauper | B60L 53/30 701/22 |
| 2020/0044386 | A1* | 2/2020 | Pabouctsidis | H01R 12/7005 |
| 2020/0306989 | A1* | 10/2020 | Vogel | G05D 1/0261 |

* cited by examiner

*Primary Examiner* — Arun C Williams
(74) *Attorney, Agent, or Firm* — Patterson + Sheridan, LLP

(57) ABSTRACT

Embodiments herein described a replaceable recharge cartridge that is coupled between a charge port of a robot and a charging station. Instead of mating the charging station directly to the charge port in the robot, the recharge cartridge can instead be inserted into the charge port and serves as an interface between the robot and the charging station. As such, the wear and tear occurs on the recharge cartridge rather than the charge port of the robot. In one embodiment, the recharge cartridge is magnetically attached to the charge port for easy installation and removal. The recharge cartridge includes a ferrous slug that is attracted to a permanent magnetic disposed in the charge port. The magnetic attraction between the permanent magnetic and the ferrous slug aligns and connects the recharge cartridge to the charge port.

20 Claims, 7 Drawing Sheets

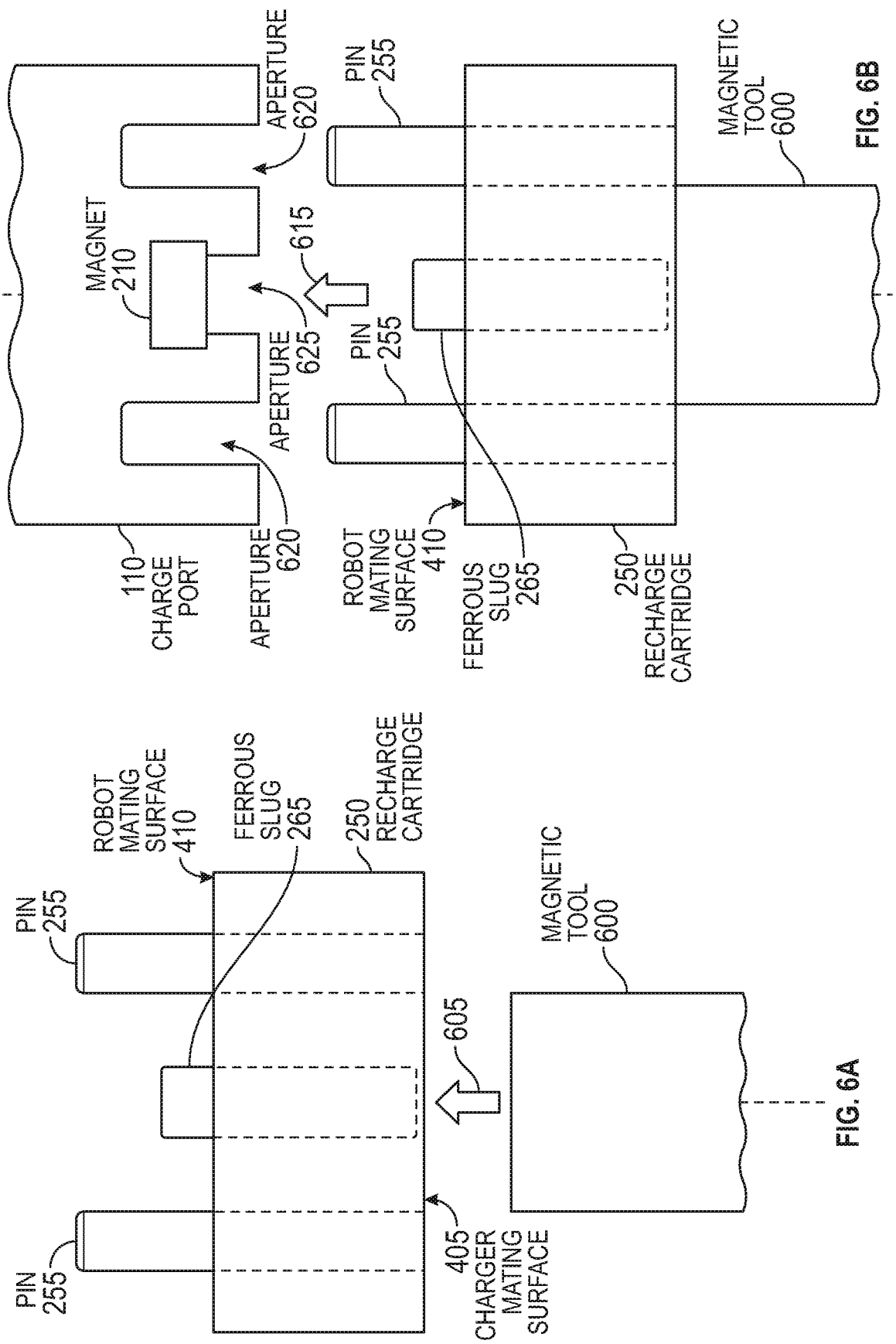

MAGNETICALLY-RETAINED RECHARGE CARTRIDGE

BACKGROUND

The present invention relates to a magnetically retained recharge cartridge, and more specifically, to using magnetic material in the recharge cartridge to attach the cartridge to a charge port of a battery-operated robot.

Autonomous robots must frequently return to a charging station to charge their batteries. For example, robots used to transport items in a warehouse return to a charging station to recharge their batteries between tasks (e.g., after completing a first task but before beginning a new task). A robot may attach to a charging station dozens of times in a twenty four hour period. A robot may recharge tens of thousands of times or more during its lifespan.

Frequent charging results in wear and tear on a charge port in the robot that mates with the charging station. This wear and tear can physically degrade the charge port and cause issues during recharging, such as improper seating between the charge port and the charging station that can result in poor charging efficiency and poor electrical connections between the robot and the charging station.

BRIEF DESCRIPTION OF DRAWINGS

FIGS. 6A-6C illustrate installing the recharge cartridge into the charge port, according to one embodiment described herein.

DETAILED DESCRIPTION

Embodiments herein describe a replaceable recharge cartridge that is coupled between a charge port of a robot and a charging station. As mentioned above, the robot may perform thousands of recharge cycles in its lifetime that require the robot to make a physical (and electrical) connection to the charging station which can cause a significant amount of wear and tear. Instead of mating the charging station directly to the charge port in the robot, the recharge cartridge is inserted into the charge port and serves as an interface between the robot and the charging station. As such, the wear and tear occurs on the recharge cartridge rather than the charge port of the robot. When a recharge cartridge is worn out, a technician can remove the old recharge cartridge and replace it with a new cartridge.

To aid with installing and removing the recharge cartridge, in one embodiment, the recharge cartridge is magnetically attached to the charge port. While other mechanical connectors can be used (e.g., fasteners, clips, screws, and the like), these connectors often require special tools and are difficult to work with within the limited space of the charge port. The recharge cartridge instead includes a ferrous slug that is attracted to a permanent magnetic disposed in the charge port. The magnetic attraction between the permanent magnetic and the ferrous slug aligns and connects the recharge cartridge to the charge port. When charging, the robot moves until the recharge cartridge aligns to, and connects with, the charging station. Using conductive elements in the recharge cartridge, the charge port establishes an electrical connection with the charging station so that the battery in the robot is charged.

Figure 1:
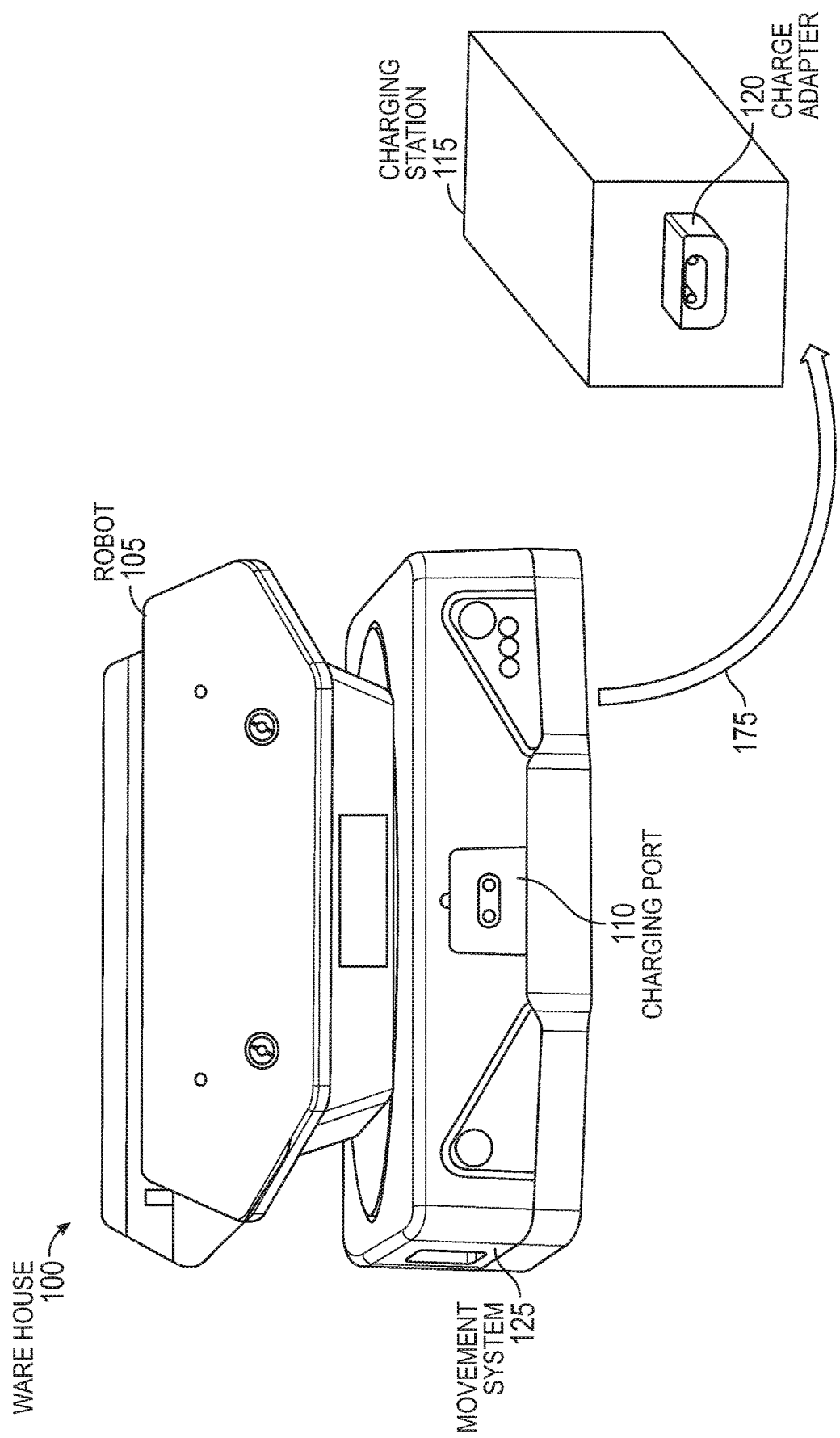
FIG. 1 illustrates a robot being charged by a charging station, according to one embodiment described herein.

FIG. 1 illustrates a robot 105 being charged by a charging station 115 in a warehouse 100, according to one embodiment described herein. In one embodiment, the robot 105 moves objects around the warehouse 100 such as packages, boxes, or shelves. The robot 105 includes a movement system 125 such as wheels or tracks that enable the robot 105 to move the objects throughout the warehouse 100. In one embodiment, the robots 105 are autonomous. For example, a controller (not shown) may send tasks to the robot 105 such as "Move Object X from Location Y to Location Z." The robot 105 then decides, using an internal controller, the best path to use to move the Object X between the locations while avoiding other robots and obstacles. As such, the robot 105 can include various sensors and communication systems for detecting objects and communicating with other robots to prevent collisions.

Alternatively, the movement of the robot 105 may be directly controlled by a central controller. For example, the warehouse 100 may include a plurality of cameras mounted in the ceiling that permit the central controller to identify the robots 105 and objects in the warehouse 100. The central controller can then provide individual instructions to the robots 105 to complete their tasks. In this scenario, the robot 105 moves or performs an action only if the action was instructed by the central controller. The central controller decides the path of the robot 105 and ensures the robot 105 does not collide with objects or other robots in the warehouse 100.

As shown, the robot 105 includes a charge port 110 configured to connect to a charger adapter 120 on the charging station 115. That is, using the movement system 125, the robot can move as shown by the arrow 175 until the charge port 110 mates with the charger adapter 120. When properly seated, an electrical connection is established between the charge port 110 and the charger adapter 120 so that the charging station 115 can recharge a battery in the robot 105.

To reduce wear and tear on the charge port 110 due to frequently connecting to the charging station 115, a recharge cartridge (not shown) is magnetically attached to the charge port 110. As a result, when charging, the recharge cartridge is disposed between the charge port 110 and the charging station 115. Thus, the frequent physical connections due to charging causes wear and tear on the recharge cartridge but not the charge port 110. As described below, the recharge cartridge is much easier to replace than the charge port 110 (and may be much less expensive). Further, the charger adapter 120 can also be a replaceable part on the charging station 115. As a result, the two components making frequent physical connections when charging can be easily replaced when worn out, or according to a maintenance schedule.

While the embodiments below discuss using a recharge cartridge to prevent wear and tear on the robot 105 (and more specifically, on the charge port 110) during charging, the recharge cartridge can be used in any charging system, whether that system is a robot or other battery operated device that connects to a charging station 115.

Figure 2:
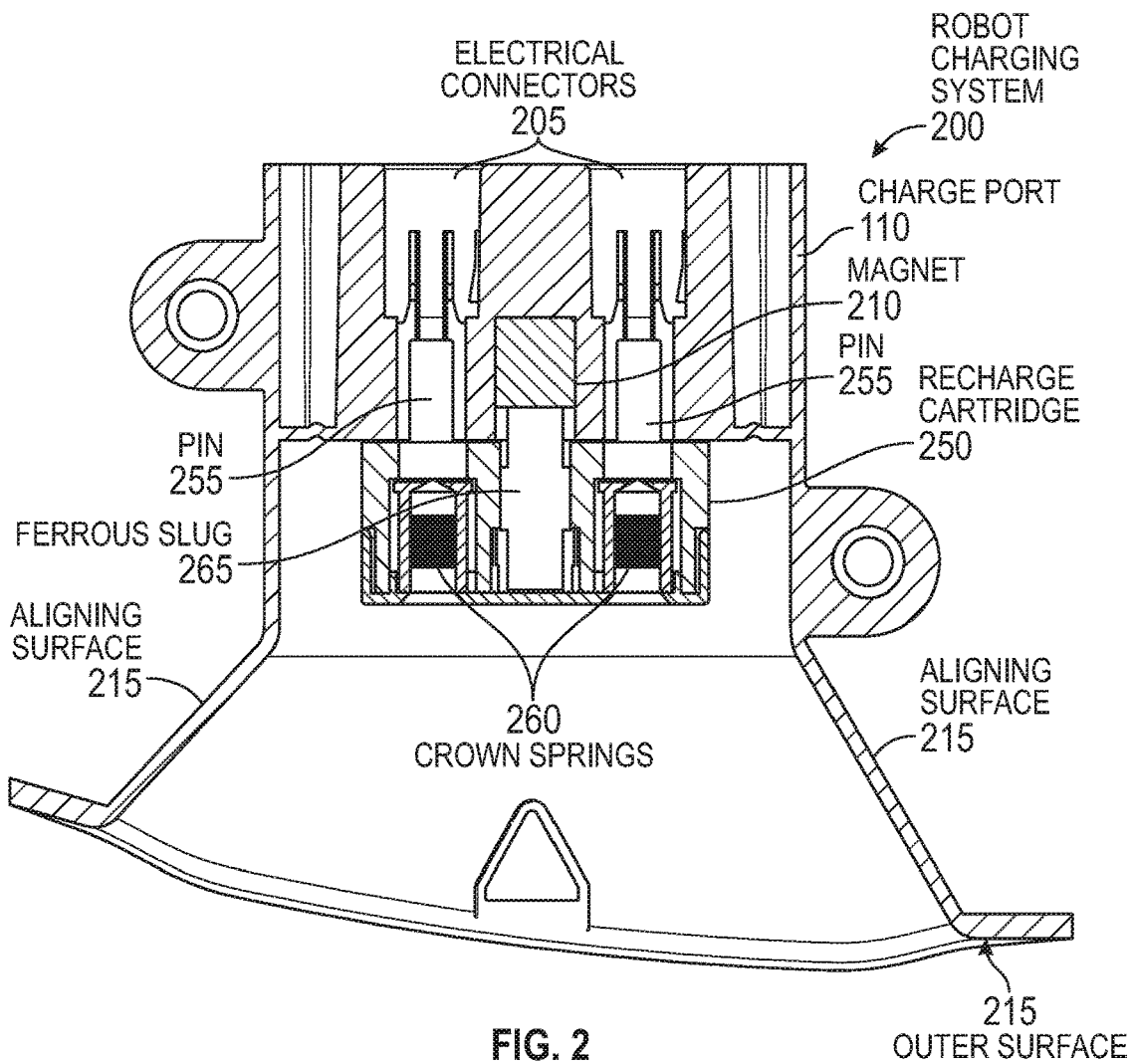
FIG. 2 illustrates a charge port in a robot coupled to a recharge cartridge, according to one embodiment described herein.

FIG. 2 illustrates coupling the charge port 110 to a recharge cartridge 250, according to one embodiment described herein. The combination of the charge port 110 and the recharge cartridge 250 form a robot charging system 200 that can be used to interface with the charging station shown in FIG. 1.

FIG. 2 illustrates a cross sectional view of the charge port 110 and the recharge cartridge 250 so that their internal components can be seen. The charge port 110 includes electrical connectors 205 which include apertures in which pins 255 of the recharge cartridge 250 are inserted (e.g., plugged in). This establishes an electrical connection between the pins 255 (e.g., a set of connection members) and the electrical connectors 205. The charge port 110 also includes a permanent magnet 210 disposed between the electrical connectors 205. When the recharge cartridge 250 is installed into the charge port 110, the magnet 210 attracts a ferrous slug 265 in the recharge cartridge 250. This magnetic attraction aids to align the pins 255 with the electrical connectors 205. Further, the magnetic attraction between the ferrous slug 265 and the magnet 210 helps to retain the recharge cartridge 250 in the charge port 110 when the robot connects and disconnects from the charging station.

The ferrous slug 265 and the permanent magnet 210 can be made from any suitable magnetic material. In one embodiment, the ferrous slug 265 is magnetic, but is not a permanent magnet. While the ferrous slug 265 could itself be a permanent magnetic, this requires the magnetic poles of the magnet 210 and the slug 265 to be aligned during manufacturing such that they will attract each other when the recharge cartridge 250 is inserted into the electrical connectors 205. This can add complexity to the manufacturing process. For this reason, it may be desired to use a ferrous material as the slug 265 that is magnetized by the magnet 210 but is not a permanent magnet.

The recharge cartridge 250 (e.g., a set of connection members) also includes crown springs 260 around corresponding apertures in which pins corresponding to the charging station (not shown) are inserted. The crown springs 260 help to hold the pins of the charging station in the recharge cartridge 250 during charging. In one embodiment, although not shown, the electrical connectors 205 can also include retaining members such as crown springs to help retain the pins 255 within the apertures formed by the electrical connectors 205. That is, the charge port 110 can include retaining members in the electrical connectors 205 that, along with the magnet 210, help to retain the recharge cartridge 250.

The charge port 110 includes aligning surfaces 215 which form a funnel to align the robot to the charging station. As shown, the aligning surfaces 215 are disposed at an angle that can guide the adapter (or plug) on the charging station to mate with the recharge cartridge 250. Doing so increases the tolerance of the charging process (e.g., the robot does not need to precisely align the charge port 110 with the adapter on the charging station to successfully connect the recharge cartridge 250 with the adapter).

In one embodiment, the charge port 110 is recessed within an outer surface 215 of the robot. That is, the various components illustrated in FIG. 2 are recessed within the robot which may protect these components as the robot moves in the warehouse. However, this is not a requirement and the charge port 110 can protrude from the outer surface of the robot.

Figure 3:
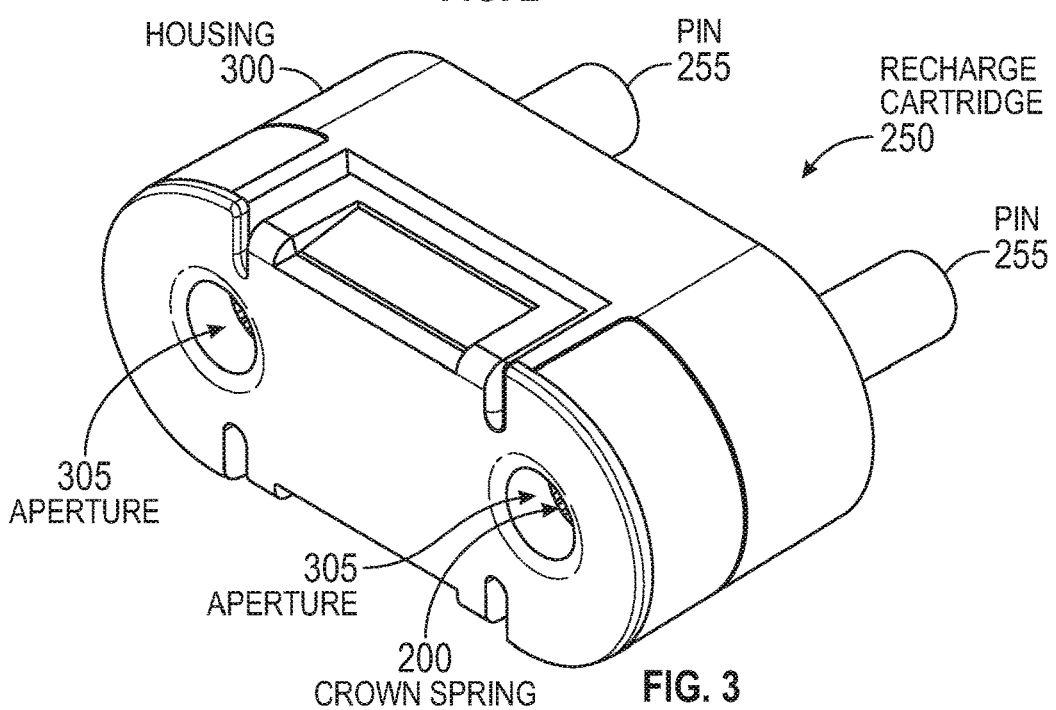
FIG. 3 illustrates a plan view of the recharge cartridge, according to one embodiment described herein.

FIG. 3 illustrates a plan view of the recharge cartridge 250, according to one embodiment described herein. The recharge cartridge 250 includes a housing 300 that provides structural support for the various parts of the cartridge 250. In one embodiment, the housing 300 may be formed using a molding process. The housing 300 can be opened so that the components in the cartridge 250 can be replaced. For example, the housing 300 may include a snap on cover.

As shown, the crown springs 260 define two apertures 305 (e.g., a set of connection members) which are mated with corresponding pins in the charging adapter of the charging station. The crown springs 260 can be made from a conductive material and are electrically connected to the pins 255. As such, when the recharge cartridge 250 is plugged into the charging station, power can be transferred from the charging station onto the crown springs 260, from the crown springs 260 onto the pins 255, and from the pins 255 into the electrical connectors of the charge port.

In FIG. 3, the crown springs 260 are recessed relative to an outer surface of the housing 300. Doing so may reduce the likelihood that a technician touches the crown springs 260, and thus, is electrically connected to the battery in the robot. Further, the collar around the crown springs can be sloped to form a funnel at the entries of the apertures 305. Thus, if the pins for the adapter on the charging station contact the sloped edges of the collar, these edges urge the pins to align with the apertures so that the adapter properly mates with the crown springs 260.

Figure 4A:
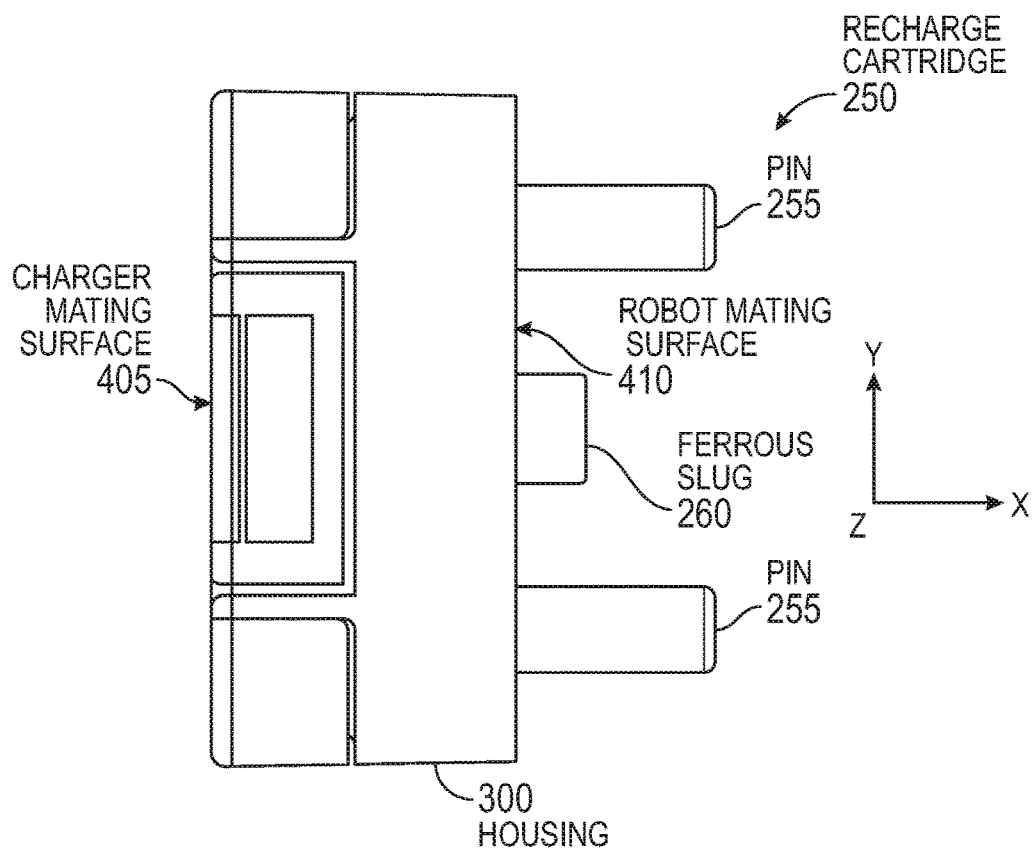
FIGS. 4A and 4B illustrate side views of two examples of recharge cartridges, according to embodiments described herein.
Figure 4B:
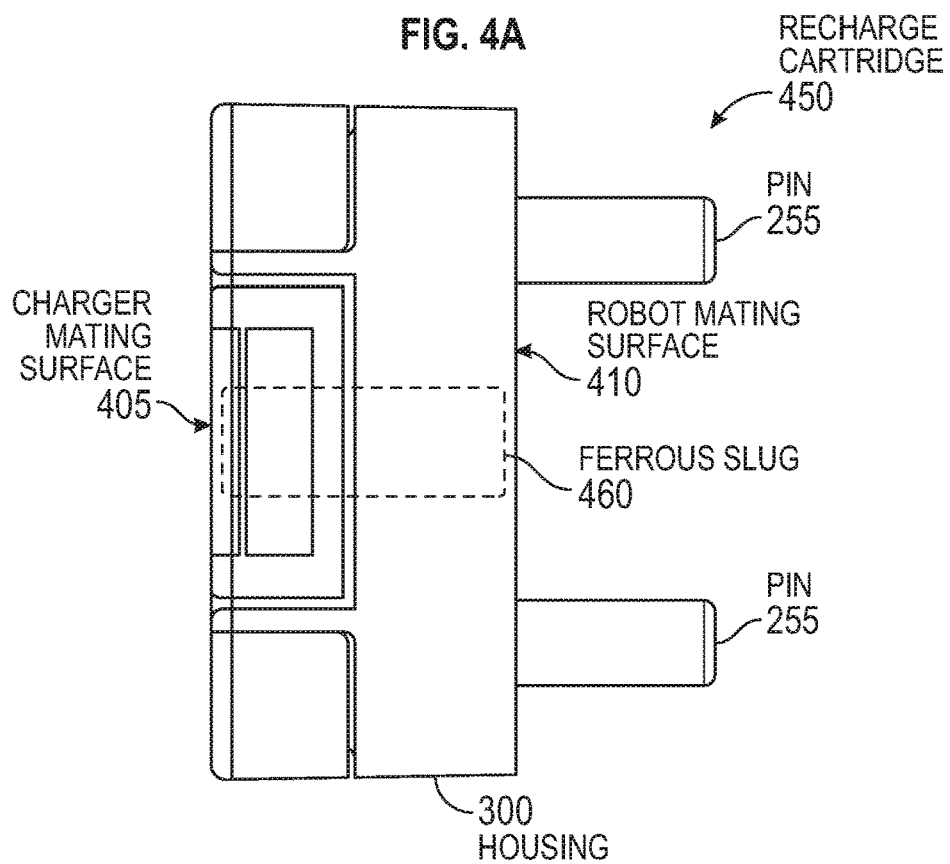

FIGS. 4A and 4B illustrate side views of two examples of recharge cartridges, according to embodiments described herein. As shown in FIG. 4A, recharge cartridge 250 includes a robot mating surface 410 that faces the pins and magnets of the charge port and a charger mating surface 405 which faces the adapter of the charging station during recharging. The pins 255 and the ferrous slug 265 protrude from the robot mating surface 410. When installed in the robot, these components mate with apertures within the charge port.

In one embodiment, the ferrous slug 265 is rigidly held in the housing 300 so that the magnetic coupling the ferrous slug 265 to the magnet in the charge port also couples the housing 300 to the charge port. While the pins 255 are attached to the housing 300, in one embodiment, the pins 255 can move slightly relative to the housing 300. For example, there may be some give or play in the housing that permits the pins 355 to move small distances in a plane defined by the Y and Z directions. This tolerance may help when mating the recharge cartridge 250 with the apertures formed by the electrical connectors in the charge port. That is, because the pins 255 are not tightly held in the housing (at least in the Y and Z directions), this increases the alignment tolerance to make it easier to mate the pins 255 with the corresponding apertures in the charge pot.

Figure 6C:
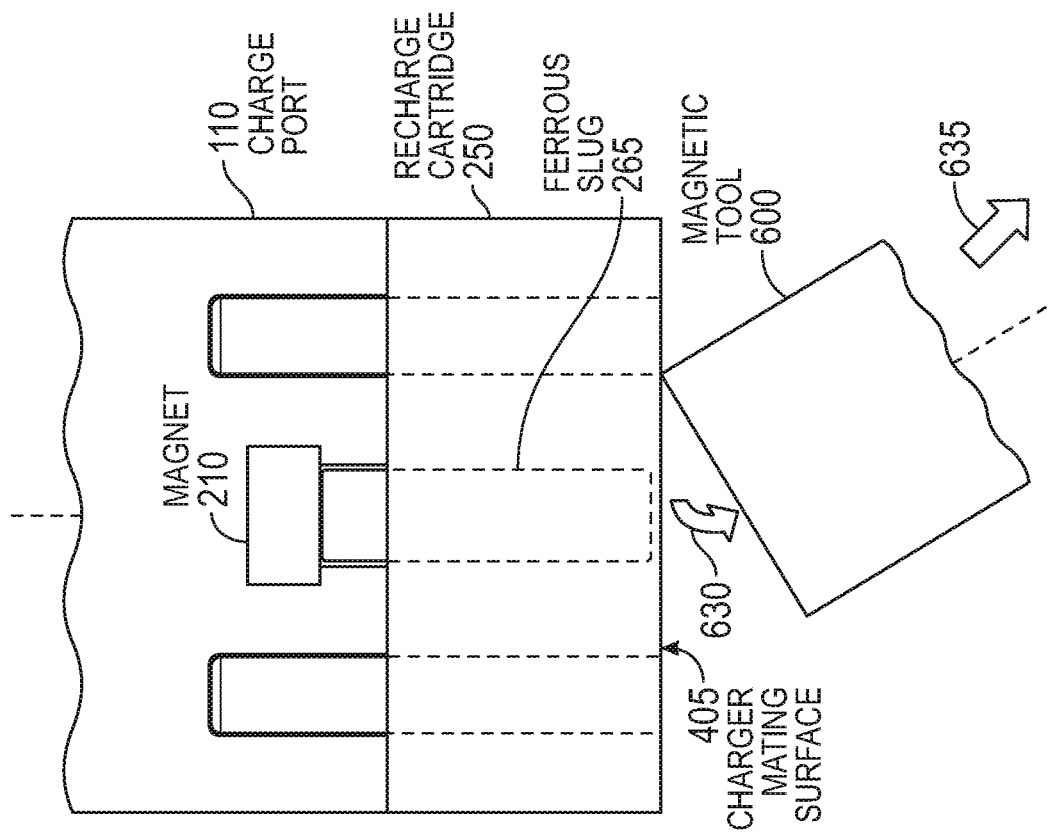

The charger mating surface 405 includes the apertures 305 in FIG. 3 which enable the recharge cartridge 250 to mate with pins in the adapter of the charging station. However, while the charger mating surface 405 includes apertures and the robot mating surface 410 include pins, the recharge cartridge can be designed in reverse where the charger mating surface 405 has pins that mate with apertures in the charger adapter and the robot mating surface 410 includes apertures for mating with pins in the charge port. However, using pins in the charger mating surface 405 may make it more difficult to use a magnetic tool to install the recharge cartridge in charge port as shown in FIGS. 6A-6C, but such a design is still feasible. In yet another example, both of the surfaces 405, 410 could include pins for mating with corresponding apertures in the charge port and the adapter of the charging station. Alternatively, both of the surfaces 405, 410 can include apertures for mating with corresponding pairs of pins in the charge port and the adapter of the charging station. In another example, the surfaces 405, 410 may each include at least one pin and at least one aperture.

FIG. 4B illustrates a recharge cartridge 450 with a recessed ferrous slug 460. That is, unlike in FIG. 4A where a portion of the ferrous slug 265 protrudes from the robot mating surface 410, in FIG. 4B the ferrous slug 460 is not exposed on the robot mating surface 410. In one embodiment, the ferrous slug 460 is completely enclosed by the housing 300 such that the ferrous slug 460 cannot be seen by a visual inspection of the outer surface of the housing 300. However, in other embodiments, the ferrous slug 460 may be exposed at the surface 410, or be recessed a few millimeters from the surface 410 and still be viewable upon visual inspection.

FIGS. 4A and 4B illustrate that the ferrous slug 265 is arranged proximate to the robot mating surface 410. In FIG. 4A, the slug 265 is exposed on, and extends from, the surface 410. In FIG. 4B, the slug 265 is recessed from the surface 410 (e.g., less than ten millimeters) but is still proximate to the robot mating surface 410. Generally, the slug 265 can be any distance from the surface 410 so long as the ferrous slug 265 can maintain a sufficiently strong magnetic attraction with the magnet in the charge port to retain the recharge cartridge 250 within the charge port.

Although the ferrous slug 460 is recessed, the slug is still close enough to the robot mating surface 410 to form a magnetic coupling with the magnet in the charge port. When using the recharge cartridge 450, the charge port 110 may have a different design that what is shown in FIG. 2. For example, the magnet 210 may be moved closer to the robot mating surface 410 which may make the magnetic force between the magnet 210 and the ferrous slug 460 stronger.

Like in FIG. 4A, the charger and robot mating surfaces 405, 410 can have different designs. That is, the charger mating surface 405 may have pins that mate with apertures in the charger adapter and the robot mating surface 410 can include apertures for mating with pins in the charge port. In another embodiment, both of the surfaces 405, 410 could include pins for mating with corresponding apertures in the charge port and the adapter of the charging station. Alternatively, both of the surfaces 405, 410 can include apertures for mating with corresponding pairs of pins in the charge port and the adapter of the charging station.

Figure 5:
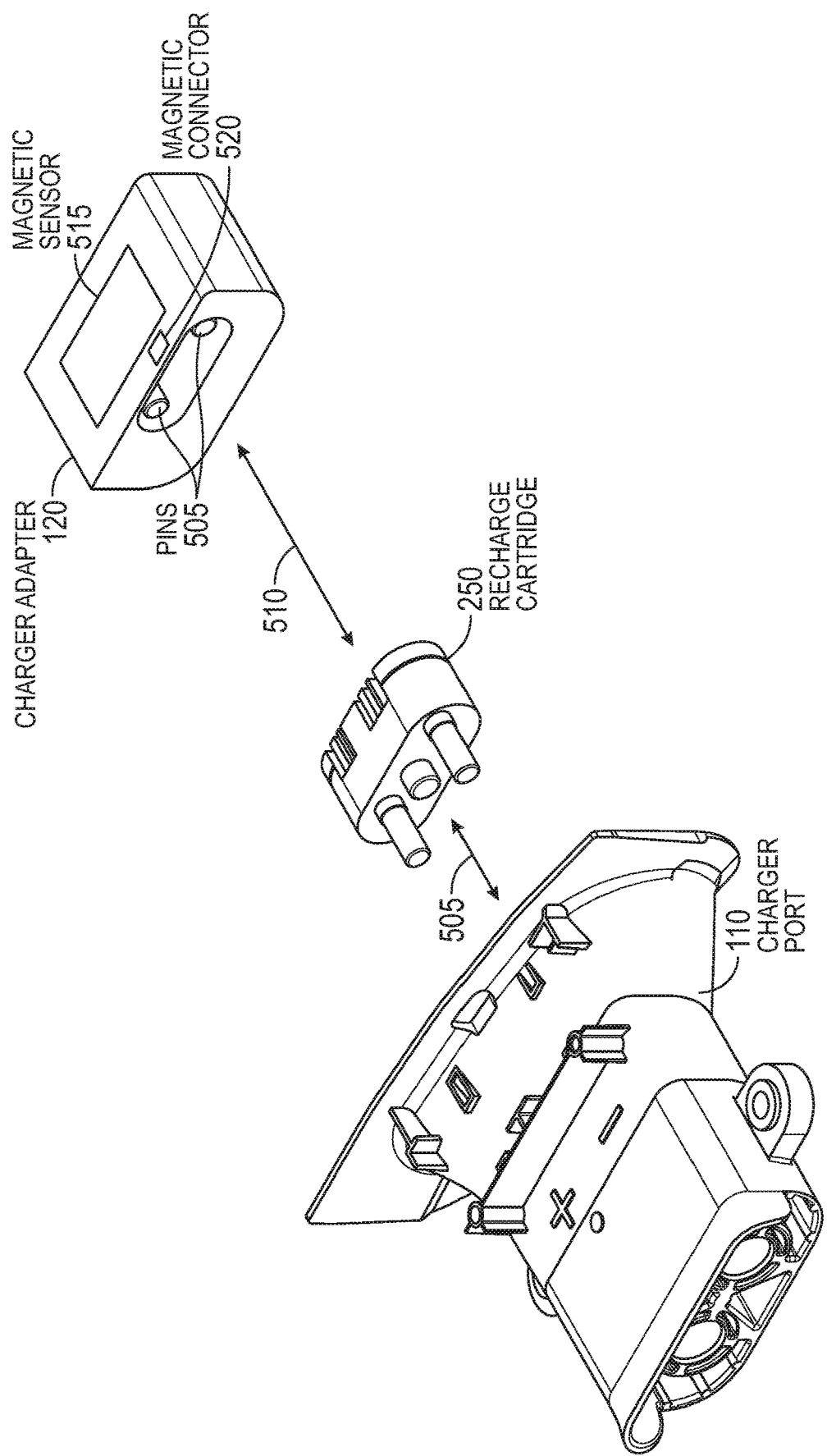
FIG. 5 illustrates coupling the recharge cartridge to the charge port in the robot and a charger adapter for the charging station, according to one embodiment described herein.

FIG. 5 illustrates coupling the recharge cartridge 250 to the charge port 110 in the robot and a charger adapter 120 for the charging station, according to one embodiment described herein. As shown by arrow 505, the recharge cartridge 250 is removably coupled to the charge port 110. That is, the recharge cartridge 250 can be installed in the charge port 110 (which is described in FIGS. 6A-6C) and uninstalled so it can be replaced (which is described in FIGS. 7A and 7B). Although not shown, the charge port 110 can include wires that extend from the side of the port 110 that is opposite to the side connected to the recharge cartridge. These wires can connect the electrical connections in the charge port 110 to the battery in the robot.

As shown by arrow 510, the charger adapter 120 is removably coupled to the recharge cartridge 250. To charge the robot, the robot aligns with the charging station such that the recharger cartridge 250 mates with the charger adapter 120. When charging is finished, the robot can move away from the charging station thereby disconnecting the recharge cartridge 250 from the charger adapter 120. Because of the magnetic attraction between the ferrous slug in the recharge cartridge 250 and the permanent magnet in the charge port 110, the recharge cartridge 250 remains coupled to the charge port 110 when the robot pulls away from the charging station. That is, the magnet attraction (and other coupling forces) retaining the recharge cartridge 250 in the charge port 110 are stronger than any coupling forces between the recharge cartridge 250 and the charger adapter 120.

In this example, the charger adapter 120 includes a magnetic sensor 515 that detects the presence of the recharge cartridge 250. In one embodiment, the magnetic sensor 515 is a Hall Effect sensor which detects the magnetic fields emitted by the ferrous slug in the recharge cartridge 250. When the ferrous slug is magnetically coupled to the permanent magnet in the charge port 110, the ferrous slug is magnetized and emits its own magnetic field. The magnetic field of the ferrous slug can then be detected by the magnetic sensor 515 as the robot aligns the charge port 110 and recharge cartridge 250 to the charger adapter 120. A controller in the charging station can monitor the output of the magnetic sensor 515, and when the output reaches a predefined threshold, the controller knows the recharge cartridge 250 and the charger adapter 120 are connected (mated) and charging can begin. If the output of the magnetic sensor 515 does not reach the threshold, the controller can signal the robot which can again try to dock to the charging station. Ensuring a good electrical connection between the recharge cartridge 250 and the charger adapter 120 is desired since a poor connection can result in electric sparks due to the high current of the charging process (e.g., 25 amps or more). These sparks can damage the charging station and the electrical system of the robot.

Rather than using the magnetic sensor 515, a limit switch or other mechanical detector can be used to determine when the charger adapter 120 has properly connected to the recharge cartridge 250 and the charge port 110. However, given the amount of times a robot may recharge, the limit switch may wear out which would require the charger adapter 120 to be replaced. However, the magnetic sensor 515 can detect the magnetic field of the ferrous slug in the recharge cartridge 250 without relying on any mechanical actuation which means the wear and tear on the magnetic sensor 515 due to frequent charging may be much less than the limit switch.

The charger adapter 120 also includes an optional magnetic connector 520 which can help to align the charger adapter 120 to the recharge cartridge 250. The magnetic connector 520 can be a ferrous slug that is magnetized by the ferrous slug in the recharge cartridge 250 as the robot connects to the charging station. The ferrous slug in the magnetic connector 520 is then magnetically attracted to the ferrous slug in the recharge cartridge 250 which helps to align the components. In another embodiment, the magnetic connector 520 is a permanent magnet that has the same arrangement of its poles as the permanent magnet in the charger port 110. Thus, both of the permanent magnets are attracted to the ferrous slug in the recharge cartridge 250, which can align the recharge cartridge 250 to the charger adapter 120. In one embodiment, using the magnetic connector 520 can mean that physical alignment elements (e.g., alignment springs or alignment surfaces) can be omitted from the charger adapter 120.

In one embodiment, the charger adapter 120 is a replaceable part of the charging station. That is, like the recharge cartridge 250, the charger adapter 120 can serve as an expendable interface between the internal components of the charging station (which may be more expensive and less accessible than the charger adapter 120) and the robot. Thus, most of the wear and tear due to docking the robot with the charging station is on the charger adapter 120 and the recharge cartridge 250. The charger adapter 120 may be removably connected to the charging station using any suitable connections means (e.g., mechanical or magnetic).

FIGS. 6A-6C illustrate installing the recharge cartridge into the charge port, according to one embodiment described herein. In FIG. 6A, it is assumed that a technician wants to install the recharge cartridge 250 into a charge port that does not currently have a recharge cartridge. To do so, FIG. 6A illustrates a magnetic tool 600, which includes a permanent magnet, that is attached to the charger mating surface 405 of the recharge cartridge 250 using the magnetic attraction between the magnetic tool 600 and the ferrous slug 265. This magnetic coupling is illustrated by arrow 605. In one embodiment, the only coupling force holding the recharge cartridge 250 on the magnetic tool 600 is this magnetic force.

FIG. 6B illustrates using the magnetic tool 600 to mate the recharge cartridge 250 to the charge port 110 on the robot. For clarity, only a portion of the charge port 110 interfacing with the recharge cartridge 150 is shown in FIG. 6B. That is, the aligning surfaces and the electrical connectors in the charge port 110 have been removed.

In one embodiment, the technician holds the magnetic tool 600 and moves the recharge cartridge 250 towards the charge port 110 as shown by arrow 615. When properly aligned, the pins 255 are inserted into corresponding apertures 620 in the charge port 110. Moreover, because the ferrous slug 265 also extends from the robot mating surface 410, the charge port includes an aperture 625 for receiving the ferrous slug 265. As mentioned above, various alignment features can be used to increase the tolerance to make it easier for the technician to align the recharge cartridge 250 to the charge port 110. For example, there may be some play in the pins 255 so that are not held completely rigid in the housing of the cartridge 250. Further, the apertures 620, 625 may have sloped collars to urge the pins 255 and the slug 265 into their corresponding apertures 620, 626. Moreover, the magnetic attraction between the permanent magnet 210 and the ferrous slug 265 (which was magnetized when coupled to the tool 600) can help to align the recharge cartridge to the apertures 620, 625 in the charge port 110.

In one embodiment, the arrangement of the poles in the permanent magnet 210 may be unknown. That is, to reduce manufacturing costs, the specification of the robot may not dictate whether the north pole or the south pole of the magnet 210 should face in the direction of the robot mating surface 410 of the recharge cartridge 250. Thus, when inserting the recharge cartridge 250, the technician may not know the orientation of the poles in the magnet 210. If the poles on the magnet 210 are misaligned with the poles of the tool 600 (e.g., the north pole of the magnet in the tool 600 is coupled to the ferrous slug 265 while the north pole of the magnet 210 in the charge port 110 is facing the ferrous slug 265), the ferrous slug 265 is repelled from the magnet 210. However, the magnetic tool 600 may be designed to it can be easily reversed. If the technician feels the magnet 210 repelling the tool 600, he can remove the cartridge 250 from the tool 600, reverse the tool 600 so the opposite pole is now facing the cartridge, reattach the cartridge 250, and then reinsert the cartridge 250 into the charge port 110. As a result, the poles in the tool 600 and the permanent magnet 210 are now aligned (e.g., opposite poles are facing each other) which will cause the permanent magnet 210 to establish a magnetic connection to the ferrous slug 265 as discussed above.

FIG. 6C illustrates detaching the magnetic tool 600 from the recharge cartridge 250. In one embodiment, the permanent magnetic in the tool 600 may be stronger than the permanent magnet 210 in the charge port 110. This may be helpful when removing the recharge cartridge 250 from the charge port (as discussed below). Thus, if the technician were to pull the tool 600 straight down (the vertical direction in FIG. 6C), the magnetic force applied by the tool 600 on the ferrous slug 265 would overcome the magnetic force applied by the permanent magnet 210 on the ferrous slug 265 and would remove the recharge cartridge 250 from the charge port 110. Instead, the technician can rotate the tool relative to the recharge cartridge 250 as shown by the arrow 630. This motion reduces the magnetic attraction between the ferrous slug 265 and the tool 600. That is, because the pins of the recharge cartridge 250 are mated to the apertures of the charge port 110, when the technician rotates the tool 600 as shown by the arrow 630, the pins prevent the cartridge 250 from also rotating, and thus, the cartridge 250 remains stationary.

Now that the magnetic coupling between the tool 600 and the ferrous slug 265 has been significantly reduced or removed completely, the technician can move the tool 600 away from the recharge cartridge 250 as shown by arrow 635 without removing the cartridge 250. That is, the magnetic attraction between the magnet 210 and the ferrous slug 265 is sufficient to retain the recharge cartridge 250 in the charge port 110.

In other examples, the technician can perform other motions to detach the tool 600 from the recharge cartridge 250. For example, the technician can slide the tool 600 along the charge mating surface 405 until the magnetic coupling between the tool 600 and the ferrous slug 265 is sufficiently reduced. In another example, rather than having a permanent magnet, the tool 600 may include an electromagnet that can be turned on and off. When attaching the cartridge 250 to the charge port 110, the technician can activate the electromagnet to perform the steps in FIGS. 6A and 6B. To detach the recharge cartridge 250 from the tool 600, the technician can turn off the electromagnet and can then pull the tool 600 away from the cartridge 250 in any direction desired since the magnetic coupling between the tool 600 and the cartridge 250 has been eliminated.

Figure 7A:
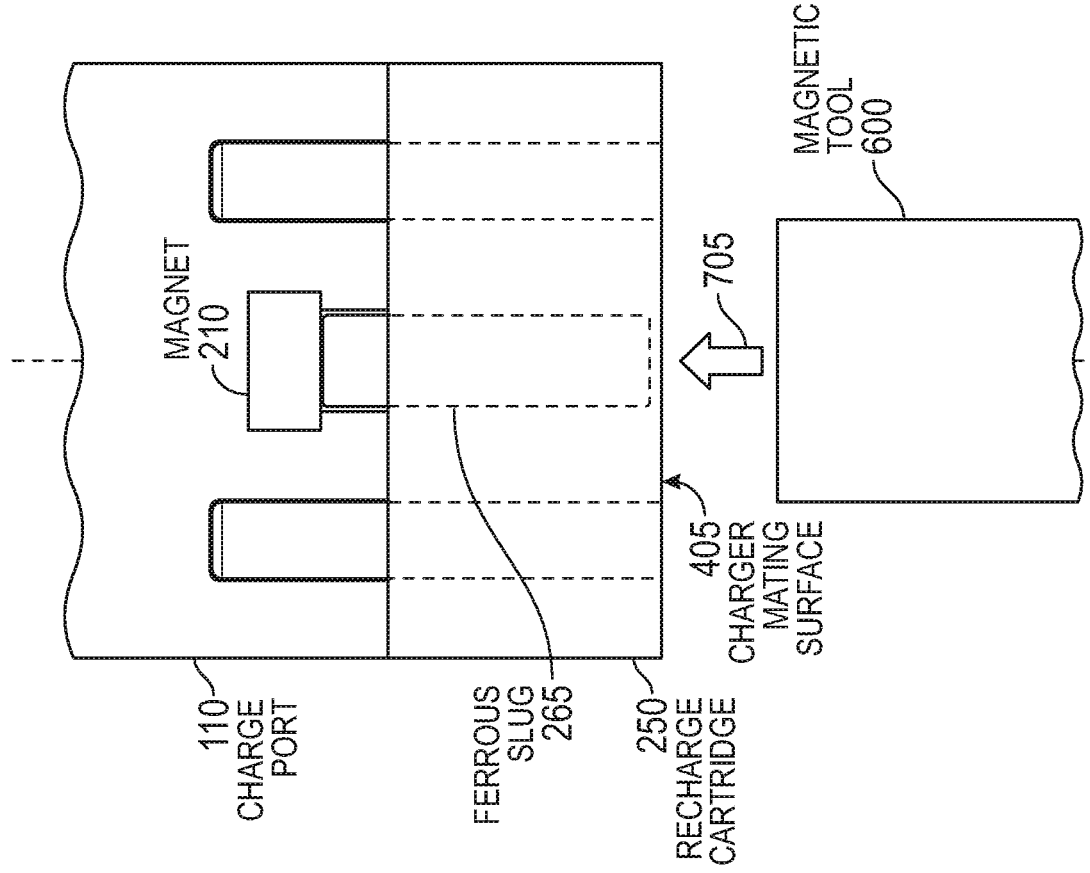
FIGS. 7A and 7B illustrate removing the recharge cartridge from the charge port, according to one embodiment described herein.
Figure 7B:
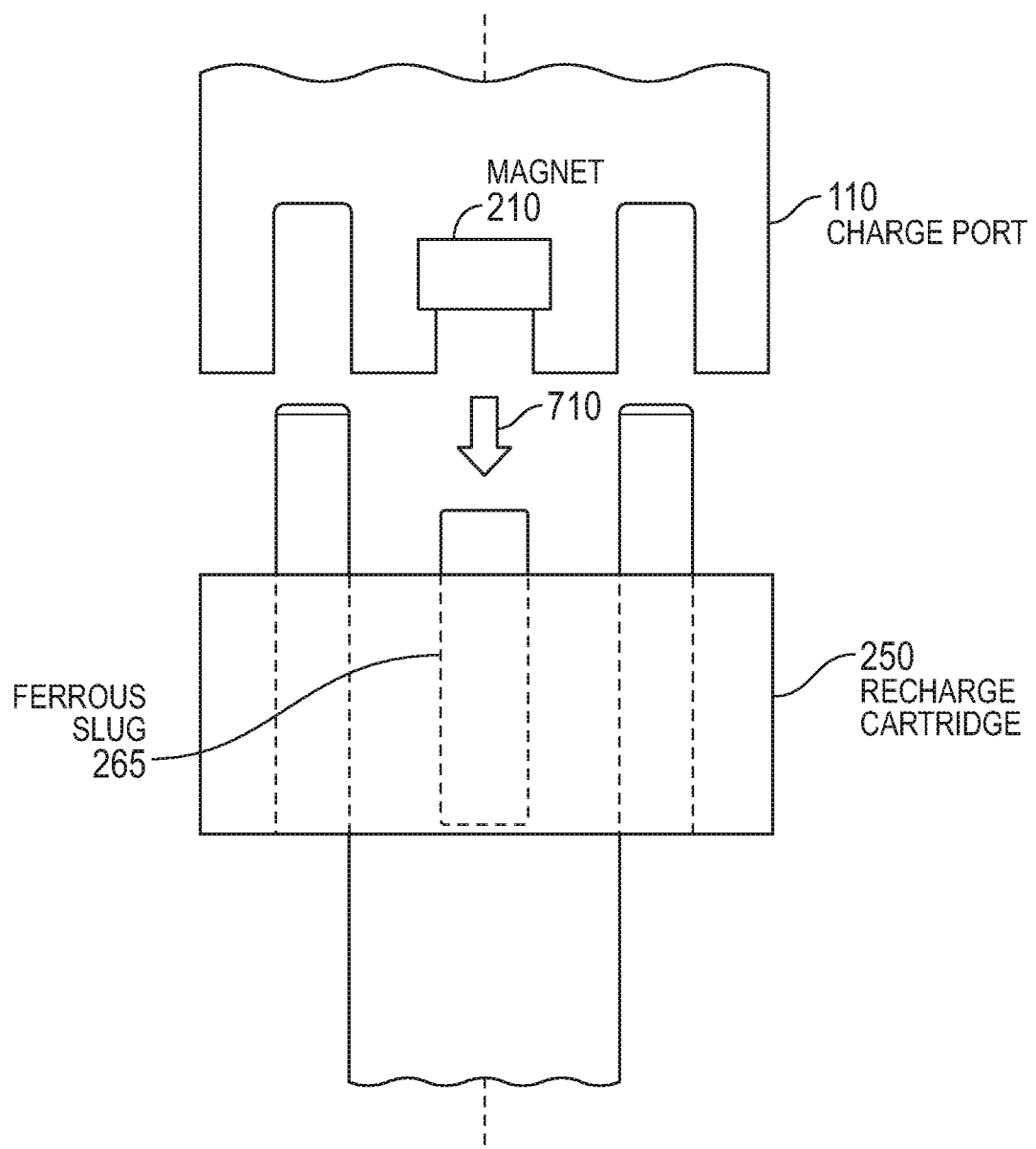

FIGS. 7A and 7B illustrate removing the recharge cartridge from the charge port, according to one embodiment described herein. FIG. 7A illustrates a technician moving the tool 600 to contact the charger mating surface 405 of the recharge cartridge 250. That is, the technician can move the tool 600 in the direction of arrow 705 until the tool becomes magnetically coupled to the ferrous slug 265. Magnetically coupling the slug 265 to the tool 600 in turn couples the recharge cartridge 250 to the tool 600. As mentioned above, the arrangement of the poles of the permanent magnet 210 may be unknown (or random). Because the ferrous slug 265 will have poles with the same arrangement as the magnet 210, the arrangement of the poles on the slug 265 may also be unknown. As such, when the technician moves the tool 600 towards the recharge cartridge 250 as shown by the arrow 705, the ferrous slug 265 repels the tool 600 if the same poles are in a facing relationship. In that case, the technician may reverse the tool 600 so that opposite poles are in a facing relationship so that the tool 600 is magnetically attracted to the ferrous slug 265.

FIG. 7B illustrates removing the recharge cartridge 250 from the charge port 110. In one embodiment, the permanent magnet in the tool 600 is stronger than the permanent magnet 210 in the charge port 110. As a result, the ferrous slug 265 is more strongly attracted to the tool 600 than the magnet 210. Thus, when the technician pulls the tool in the direction indicated by arrow 710, this forces pulls the recharge cartridge 250 away from the charge port 110. In this manner, the technician can remove the recharge cartridge 250 from the charge port 110. The steps illustrated in FIGS. 6A-6C can then be used to insert or install a new recharge cartridge 250.

In one embodiment, the technician removes the recharge cartridge 250 in response to a predefined replacement schedule (e.g., every year) or based on visual inspective of the recharge cartridge 250 to identify wear and tear. In another example, the recharge cartridge 250 is replaced based on a reduction in charge efficiency. The robot may track its charge efficiency, and when it decreases below a threshold, sends a signal a technician to replace the recharge cartridge 250 since the wear and tear on this part may have caused the drop in efficiency.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A recharge system comprising:
   a robot comprising a charge port and a permanent magnet,
   a removable recharge cartridge magnetically attached to the charge port, wherein the recharge cartridge serves as an interface between the charge port and a charging station when charging the robot,
   wherein the recharge cartridge comprises:
      a robot mating surface that faces the charge port and comprises a pair of pins for mating with the charge port,
      a charge mating surface facing the charging station when charging the robot, the charge mating surface comprising a pair of apertures configured to mate with pins on the charging station, and
      a ferrous slug arranged to magnetically couple the recharge cartridge to the magnet in the charge port.

2. The recharge system of claim 1, wherein at least a portion of the ferrous slug extends from the robot mating surface.

3. The recharge system of claim 2, wherein the portion of the ferrous slug is disposed between the pair of pins.

4. The recharge system of claim 1, wherein the charging station comprises a magnetic sensor configured to detect a magnetic field associated with the ferrous slug to determine when the robot has mated with the charging station.

5. The recharge system of claim 4, wherein the charging station comprises a magnetic connector configured to magnetically connect to the ferrous slug to mate the robot to the charging station when charging the robot.

6. A recharge cartridge, comprising:
   a first mating surface configured to face a charge port and comprising a first set of connection members for mating with corresponding connection members in the charge port,
   a second mating surface configured to face a charging station and comprising a second set of connection members configured to mate with corresponding connection members on the charging station, and
   a ferrous slug arranged proximate to the first mating surface to magnetically couple the recharge cartridge to a magnet in the charge port, thereby removably attaching the recharge cartridge to the charge port.

7. The recharge cartridge of claim 6, wherein the ferrous slug is disposed between at least two of the first set of connection members.

8. The recharge cartridge of claim 7, wherein the at least two of the first set of connection members are pins that extend from the first mating surface.

9. The recharge cartridge of claim 7, wherein the at least two of the first set of connection members are apertures that extend from the first mating surface into the recharge cartridge.

10. The recharge cartridge of claim 7, wherein the ferrous slug is disposed between at least two of the second set of connection members.

11. The recharge cartridge of claim 10, wherein the at least two of the second set of connection members are apertures that extend from the second mating surface into the recharge cartridge.

12. The recharge cartridge of claim 10, wherein the at least two of the second set of connection members are pins that extend from the second mating surface.

13. The recharge cartridge of claim 6, wherein the ferrous slug is not a permanent magnet and wherein the magnet in the charge port is a permanent magnet.

14. The recharge cartridge of claim 6, wherein at least a portion of the ferrous slug extends from the first mating surface and mates with a corresponding aperture in the charge port.

15. The recharge cartridge of claim 6, wherein the first and second mating surfaces are disposed on opposite sides of the recharge cartridge.

16. The recharge cartridge of claim 15, wherein the first and second sets of connection members are electrically connected through the recharge cartridge.

17. A method, comprising:
- attaching a recharge cartridge comprising a ferrous slug to a first magnet in a tool; and
- installing, using the tool, the recharge cartridge into a charge port comprising a second magnet, wherein the recharge cartridge comprises:
  - a first mating surface facing the charge port and comprising a first set of connection members for mating with corresponding connection members in the charge port, and
  - a second mating surface configured to face a charging station, the second mating surface comprising second set of connection members configured to mate with corresponding connection members on the charging station.

18. The method of claim 17, further comprising:
- detaching the tool from the recharge cartridge such that the first magnet is no longer attracted to the ferrous slug and the ferrous slug remains magnetically coupled to the second magnet.

19. The method of claim 18, wherein the first magnet is a stronger magnet than the second magnet.

20. The method of claim 18, wherein the ferrous slug is disposed between at least two of the first set of connection members and between at least two of the second set of connection members.

* * * * *